Patented Apr. 20, 1954

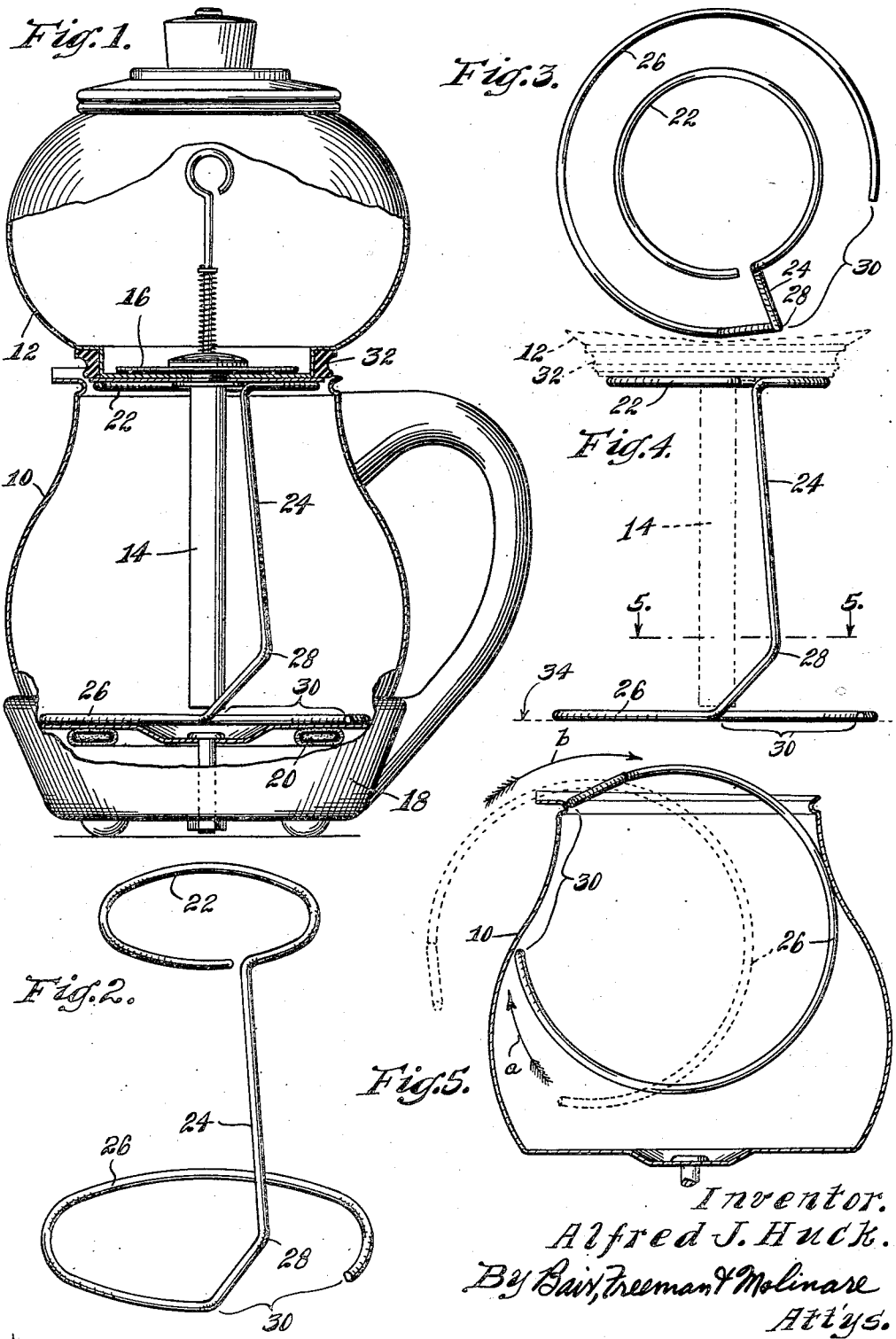

2,675,754

UNITED STATES PATENT OFFICE 2,675,754

COFFEE BOWL SUPPORT

Alfred J. Huck, St. Louis, Mo., assignor to Knapp-Monarch Company, St. Louis, Mo., a corporation of Delaware Application March 4, 1950, Serial No. 147,702

1 Claim. (Cl. 99—292)

This invention relates to a support for the upper coffee bowl of a coffee maker of the vacuum-operated type.

One object of the invention is to provide a support which is comparatively simple and inexpensive to manufacture.

Another object is to provide a support which is so designed that it can be shipped along with the coffee maker without requiring any additional packaging space.

Still another object is to provide a support which is so designed that it can be threaded into the lower bowl of the coffee maker and thus contained therein during shipment, the support serving at that time to support the upper bowl against contact of its gasket with the lower bowl so that between packaging time and consumer use time the gasket is not under compression as when the upper bowl is pressed into place with respect to the lower bowl in accordance with usual packaging practice.

A further object is to provide a support formed of a specially shaped piece of wire having a circular part as a base and another circular part as a support on which the upper coffee bowl rests with its syphon tube thus held spaced from a supporting surface on which the support rests, the upper and lower rings of the support being connected by a leg of special shape and the lower ring being open at one side to permit threading of the support into the lower coffee bowl during shipping and storing and between coffee making operations.

With these and other objects in view, my invention consists in the construction, arrangement and combination of the various parts of my coffee bowl support, whereby the objects contemplated are attained, as hereinafter more fully set forth, pointed out in my claim, and illustrated in the accompanying drawings, wherein:

Figure 1 is a side elevation partly in section of a coffee maker with my support associated therewith as during shipping or between coffee making operations.

Figure 2 is a perspective view of the support per se.

Figure 3 is a plan view thereof.

Figure 4 is a side view looking upwardly at Figure 3; and

Figure 5 is a sectional view on the line 5—5 of Figure 4 showing how the support is threaded into the lower bowl of the coffee maker.

On the accompanying drawing I have used the reference numeral 10 to indicate the lower bowl and 12 the upper bowl of a vacuum-type of coffee maker. The upper bowl 12 has a depending syphon tube 14. A filter 16 is used in the usual manner and the lower bowl is supported on a base 18 in which there is a heating element 20 for heating the lower bowl 10.

My upper bowl support comprises a length of wire formed into an upper ring 22, a leg 24 and a lower ring 26. The leg 24 has a bend at 28, the ring 22 is substantially a complete circle as shown and the ring 26 is somewhat less than a complete circle, the gap being indicated at 30.

The length of the leg 24 is such that when the ring 26 is on the bottom of the lower bowl 10, the bottom of the upper bowl 12 may rest on the ring 22 and the gasket 32 carried by the upper bowl will be spaced from the upper edge of the lower bowl 10 as shown in Figure 1, thus avoiding all unnecessary compression of the gasket.

The gap 30 is sufficient so that the ring 26 may be associated with the lower bowl 10 as shown by dotted lines in Figure 5, the support then rolled clockwise as indicated by the arrows a and b to the full line position and still farther after that into the bowl whereupon the support may be tilted to assume the position illustrated in Figure 1. Thus the support is capable of being stored out of the way between coffee making operations and also during shipping and storage prior to sale of the coffee maker with the gasket 32 supported at such a height that it is not under compression during these periods of time. This lengthens the life of the gasket to the maximum.

At the same time a support is provided which, after the coffee brewing operation has been completed, permits the upper bowl and its depending syphon tube 14 to be supported on a table, stove or other surface such as indicated at 34 in Figure 4 until such time as it is desirable to remove the coffee grounds and wash the upper bowl. The syphon tube 14, of course, presents a problem in supporting the upper bowl which problem is nicely solved by the elevated position of the ring 22 above the surface 34 to hold the syphon tube 14 above such surface. Thus a dual purpose support is provided which at the same time is comparatively simple and inexpensive to manufacture.

Some changes may be made in the construction and arrangement of the parts of my coffee bowl support without departing from the real spirit and purpose of my invention, and it is my intention to cover by my claim any modified forms of structure or use of mechanical equivalents which may be reasonably included within their scope.

I claim as my invention:

A support for the upper bowl of a vacuum coffee maker, which coffee maker consists of an upper bowl having a downwardly depending funnel and a lower bowl having a mouth formed at the upper end thereof; said support comprising a substantially ring-shaped supporting element adapted to support said upper bowl thereon with the funnel of the upper bowl extending therethrough, a post extending downwardly from said ring-shaped supporting element and terminating in a substantially ring-shaped base element of a size adapted to be positioned in the lower bowl of the coffee maker, said base ring being of a greater diameter than the mouth of the lower bowl, the distance from said base ring to said supporting ring being greater than the distance between the bottoms of the bowls of the coffee maker when said bowls are connected together, and said base ring being incomplete so that it is adapted to be threaded into or out of the lower bowl of the coffee maker.

References Cited in the file of this patent

UNITED STATES PATENTS

| Number | Name | Date |
|---|---|---|
| 204,683 | Rice | June 11, 1878 |
| 745,875 | Mayhew | Dec. 1, 1903 |
| 2,174,093 | Perlman | Sept. 26, 1939 |
| 2,216,255 | Tate | Oct. 1, 1940 |
| 2,312,556 | Jepson | Mar. 2, 1943 |
| 2,416,149 | Botts | Feb. 18, 1947 |
| 2,449,619 | Reichhold | Sept. 21, 1948 |